March 19, 1940. R. R. DE VORE 2,193,806
DEVICE FOR POWER TRANSMISSION FOR VARIABLE LOAD RATIOS
Filed June 30, 1938
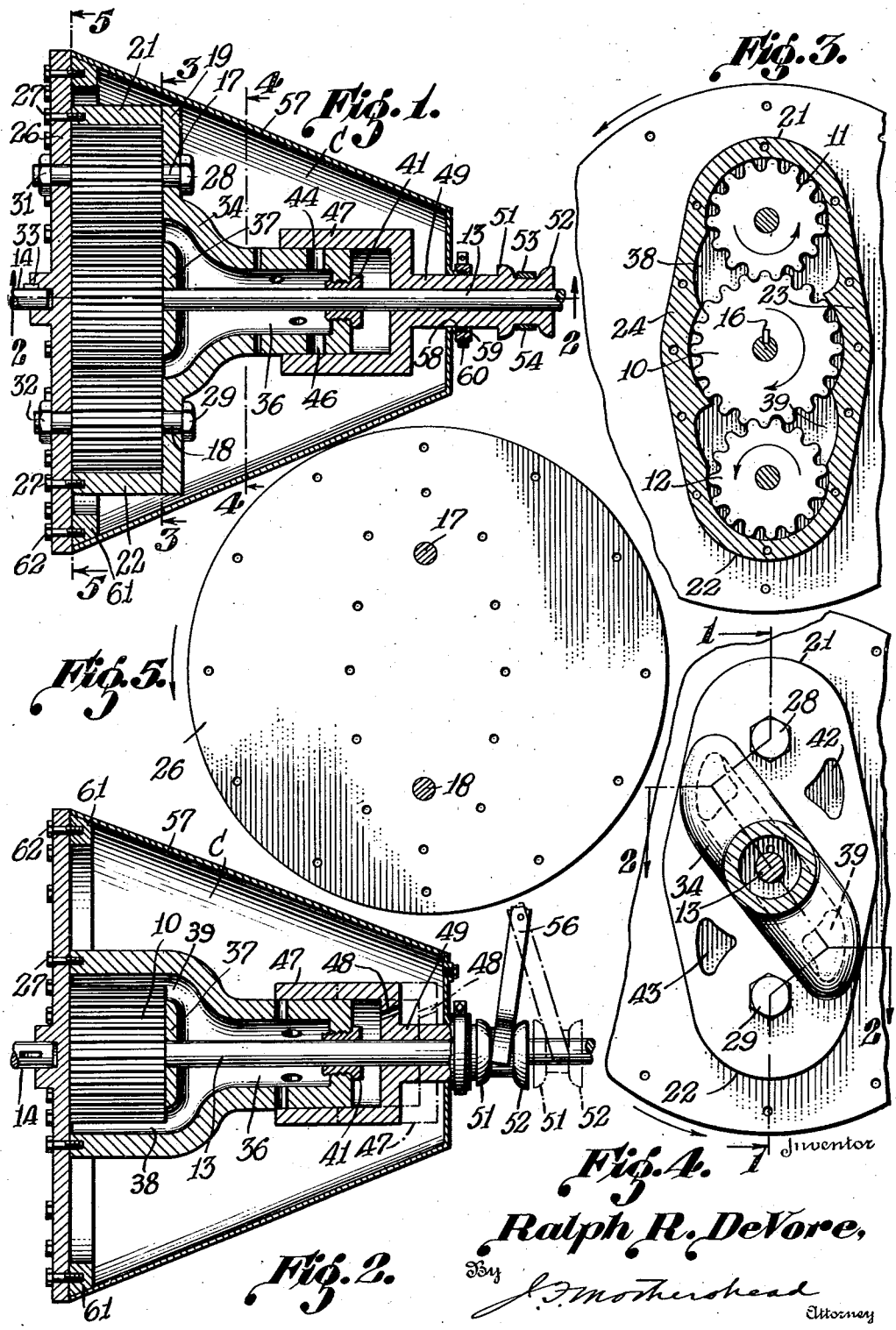
Inventor
Ralph R. DeVore,
By
[signature]
Attorney Patented Mar. 19, 1940

2,193,806

UNITED STATES PATENT OFFICE 2,193,806

DEVICE FOR POWER TRANSMISSION FOR VARIABLE LOAD RATIOS

Ralph R. De Vore, Washington, D. C.

Application June 30, 1938, Serial No. 216,749

2 Claims. (Cl. 192—61)

(Granted under the act of March 3, 1883, as amended April 30, 1928; 370 O. G. 757)

This invention relates to hydraulic transmissions for transmitting mechanical power at torques and at speed ratios which may vary over a suitable range. In equipment of this general class a pressure fluid such as oil may be utilized to control the relative rotation and travel of gears, usually of the impeller type, arranged to constitute a pressure fluid translating means when flow of the pressure fluid is permitted, and when flow of the pressure fluid is completely stopped power is then transmitted at torque and speed ratios which are substantially unity. These ratios may be varied by controlling the flow of pressure fluid. Frequently, pressure fluid used in this manner is subjected to conditions of operation such as heavy duty and/or high speeds, which cause the fluid to become heated to a degree rendering it unsatisfactory for further use without first cooling the fluid. It is also highly desirable that rotatable parts of this equipment be substantially in static and dynamic balance and that means be provided to assure adequate control of the flow of pressure fluid for effecting the transmission of power at ratios which may vary over a suitable range by comparatively small increments.

The purposes of this invention are to improve the efficiency of a device of the class described and to provide for attaining this desirable objective by improvements in construction and relative arrangement of parts which are also adapted to assure adequate and efficient cooling of pressure fluid before reuse of the same; to provide for maintaining the transmission substantially in static and dynamic balance; and also to provide for controlling the flow of pressure fluid so as to make it possible to transmit power at ratios which may vary over a given range by very small increments.

A feature of the invention resides in the pressure fluid circulatory system which includes a cooling chamber of relatively large capacity, preferably sufficient to contain more than half of the pressure fluid in the system. This cooling chamber may be, and preferably is, shaped to perform its mechanical functions efficiently and also to have a heat transfer surface, as an exterior surface, which is comparatively large for the capacity of the chamber.

Another feature of the invention resides in the arrangement of the gearing and other parts so that the device as a whole is substantially in static and dynamic balance.

Another feature resides in the valve means for controlling the flow of pressure fluid in the circulatory system. This valve means is responsive to movements in substantially like increments for changing the port or flow area in increments changing progressively in both the closing and opening directions of movement of said valve means. This provides for finer adjustment and control of the flow of pressure fluid in the circulatory system.

The features of the invention are illustrated in the accompanying drawing, wherein:

Fig. 1 is a section along the longitudinal axis of a hydraulic transmission, this view being taken along the broken line I—I of Fig. 4;

Fig. 2 is a section along the line 2—2 of Fig. 4, with certain movable parts in different relative positions than those shown in Fig. 1;

Fig. 3 is a section along the line 3—3 of Fig. 1;

Fig. 4 is a section along the line 4—4 of Fig. 1; and

Fig. 5 is a section along the line 5—5 of Fig. 1 with the attaching elements removed.

The illustrated embodiment comprises a sun gear 10 and orbit gears 11 and 12 symmetrically disposed about the sun gear and in enmeshment with the sun gear for transmitting power between aligned shaft sections 13 and 14. The sun gear may be fixedly mounted on shaft section 13 by means of a key 16, as shown in Fig. 3, and the orbit gears 11 and 12 may be rotatably mounted on shafts 17 and 18, respectively. These gears may be disposed in a housing comprising a casting 19, having a flange comprising arcuate end portions 21 and 22 disposed about the gears 11 and 12, respectively, and the side portions 23 and 24 extending between the arcuate portions and enclosing the sun gear. The shafts 17 and 18 for rotatably supporting the orbit gears may be in the form of bolts extending through the casting 19 and through a cover plate or closure member 26 which may be secured to the flange of the housing by suitable attaching elements such as bolts 27. The shafts 17 and 18 may be secured against rotation in any approved manner as by providing each of these shafts with a flat or irregular surface (not shown) fitting a complementary surface in the housing. Shafts 17 and 18 may be provided with hexagonal or other suitable heads 28 and 29, respectively, and the other ends of these shafts may be fitted with nuts 31 and 32, respectively. The nuts 31 and 32 are adaptable to engage the end plate 26 and, in this way, to assist in holding this closure plate against the flange of the casting 19. The shaft section 14 may also be fixedly secured to the gear housing as by means of any suitable connection, here shown as a key 33, disposed between the shaft 14 and the closure plate 26.

The casting 10 may also be provided with a centrally disposed hollow extension 34 which may be substantially cylindrical on its outer end portion. The hollow interior of this extension provides an axially extending passage 36 which diverges about a central bearing boss 37 for the shaft section 13, and leads to a discharge port 38 for gears 10 and 11 (Figs. 3 and 4), and also to a discharge port 39 for gears 10 and 12. The outer end of this extension may be closed and sealed about the shaft section 13 by means of a suitable packing 41. The casting 10 may also be provided with suitable openings 42 and 43 (Fig. 4), which constitute the pressure fluid intake ports for gears 10 and 11 and for gears 10 and 12, respectively.

The cylindrical extension 34 may be provided with one or more series of ports, preferably with two series of ports 44 and 46, respectively, through which pressure fluid may circulate. Preferably, the ports of each of these series are spaced longitudinally along the passage 36 by having the ports of each series arranged in substantially helical paths which may be oppositely directed about this extension so that the ports of each series are disposed in paths extending substantially 180 degrees around opposite sides of this extension, as shown in Figs. 1 and 2. Preferably, the ports of each series vary progressively in area, the outermost port of each series, or the one farthest to the right, as viewed in Fig. 1, having the largest flow area and the innermost port of each series, or the one farthest to the left, as viewed in Fig. 1, having the smallest flow area. The flow of pressure fluid through these ports may be controlled by a valve member 47 in the form of a cylinder having an open end and fitting slidably over the cylindrical portion of the extension 34. This valve member may be provided with a suitable vent 48 (Fig. 2) disposed in the closed end thereof. This valve member may be slidably mounted on the shaft section 13 by means of a bearing sleeve 49 carried by the closed end of the valve member. Suitable means such as the spaced collars 51 and 52 may be formed on the outer end of the bearing sleeve to provide a circumferential groove or channel in which the forked ends or furcations 53 and 54 of a floating lever 56 may ride.

A casing 57 may be disposed about the extension 34 and valve member 47, and at its outer end (Figs. 1 and 2) this casing may be sealed in substantially fluid tight relation with respect to the bearing sleeve 49 in any suitable manner, as by means of a flange 58 carried by the casing and fitting about the sleeve, and a suitable packing 59 disposed about the bearing sleeve between the flange 58, and a retaining nut 60 which may have threaded engagement with the flange. This end of the casing may also be provided with a suitable vent (not shown). This casing may be substantially frusto-conical in form, having its larger end following the cylindrical contour of the closure plate 26 and abutting the inner surface of this plate. An annular rib 61 may be secured about the plate 26 by means of attaching elements such as bolts 62 to provide a support for the larger end of the casing 57. This casing may be secured against the outer surface annular rib and in fluid tight relation therewith in any approved manner as by welding the casing to this rib.

The space enclosed by this casing, the housing comprising the casting 19 and the closure plate 26, and the valve member 47 provide a cooling chamber C into which pressure fluid is adapted to be discharged directly from the ports of the series 44 and 46, respectively. This chamber forms a part of a pressure fluid circulatory system, comprising the intake ports 42 and 43, the space between the gears 10, 11, and 12 and the flange of the housing, the passage 36 and the ports of the series 44 and 46. This chamber is adapted to contain the greater proportion, and preferably about 60 per cent of the pressure fluid in the circulatory system, although good results may be obtained when this chamber has capacity representing between 50 and 60 per cent, or more, of the total capacity of the circulatory system. The rather peculiar shape of this chamber gives it an exterior surface which has a comparatively large area for the capacity of the chamber. This exterior surface functions as a heat transfer surface which may be exposed to suitable cooling media, such as atmospheric air. As the exterior surface of the extension 34 is also cooled by fluid in the chamber C, it will be seen that this extension also serves to some extent as a heat transfer surface, and that fluid in the passage 36 is therefore in heat transfer relation with fluid in chamber C. The substantially conical walls of the casing 56, as illustrated in Figs. 1 and 2, cause a body of fluid such as oil to tend to work inwardly along these conical wall portions during operation due to the centrifugal force of the rotating body of fluid. This reduces any tendency for leakage along the bearing sleeve 49 and also provides for maintaining the main body of pressure fluid in the cooling chamber about the valve ports of the series 44 and 46, respectively, and about the intake ports 42 and 43.

In some applications or uses of this device it may be advantageous to connect the unit to a driven member such as a fly wheel, as, for example, when the unit is used with an internal combustion in an automobile in place of transmissions and/or clutches now in use. An installation of this kind may be made conveniently by connecting the gear housing directly to the fly wheel as by means of bolts (not shown) connecting the closure plate 26, for example, with the fly wheel. In this type of installation the shaft section 14 would be either the crank shaft of the engine or a shaft section connected to the crank shaft.

In operation of this power transmitting unit the cooling chamber C and the circulatory system may be substantially filled with a suitable pressure fluid such as oil, and power may be transmitted in either direction between the shaft sections 13 and 14, through the gearing 10, 11, and 12, and the gear housing comprising a casting 19 and closure plate 26. When the floating lever 56 is moved to the position shown in Fig. 2, the axially sliding valve member 47 is also moved to a position to close all of the ports of the series 44 and 46, respectively, except the smallest ports of each series. It will be understood that when the valve member 47 is moved farther to the left, as viewed in Fig. 2, so as to close all of the ports of the series 44 and 46, circulation of pressure fluid will be completely stopped and the gears 11 and 12 will be effectively locked in engagement with the gear 10 and, therefore, the shaft sections 13 and 14 must rotate in unison. When the valve member 47 occupies the position shown in Fig. 2 and ports of each series are arranged substantially as illustrated, only the smallest ports of each series are uncovered and only a restricted flow of pressure fluid is permitted. This restricted flow permits the gears 11 and 12 to travel in an orbit relative to the gear 10, and in so doing the gears 11 and 12 cooperate with the gear 10 to function as a pressure fluid translating means or gear pump. As the slidable valve member 47 is moved in this manner to uncover additional ports, the flow of pressure fluid will become less restricted and travel of the gears 11 and 12 in their orbit relative to the gear 10 will become more rapid. When the valve member 47 has been moved to the position indicated in dotted lines in Fig. 2, all of the ports of each series will have been uncovered and there will be full and substantially unrestricted flow of the pressure fluid through the circulatory system. This will permit the gears 11 and 12 to travel freely about the gear 10, and practically no power will be transmitted between the shaft sections 13 and 14.

When power is applied to the shaft section 14 or to the gear housing to rotate this housing in a counter-clockwise direction, as viewed in Fig. 3, the gears 10, 11 and 12, and the housing will rotate in the directions indicated by the arrows when flow of pressure fluid is permitted.

From the foregoing it will be evident that the mechanical power transmitted between the shaft sections 13 and 14 and the torque and speed ratios may be varied progressively by moving the floating lever to bring the valve member 47 to a position in which it controls the flow to give practically any desired result. As the ports first uncovered by the valve member 47 in moving from its closed position may be, and preferably are, very small and succeeding ports may increase progressively in area, as shown, a very fine adjustment and accurate control of the pressure fluid, and hence, of the torque and speed ratios, are possible with this transmission. It will also be noted that the symmetrical arrangement of the gearing and other parts of this transmission about the axis of rotation provides a device which is inherently in static and dynamic balance, and is therefore substantially free from all unnecessary vibration and noise.

The invention described herein, if patented, may be manufactured and used by or for the Government for governmental purposes without the payment to me of any royalty thereon.

What I claim is:

1. A fluid pressure transmission of the class described, comprising shaft sections, a sun gear of the impeller type fixed on one of said shaft sections, orbit gears of the impeller type cooperating with said sun gear to provide a pressure fluid impelling means, means rotatable with the other of said shaft sections for supporting said orbit gears, a pressure fluid circulatory system comprising a fluid cooling chamber having a relatively large surface area exposed to atmospheric air, means for conducting pressure fluid from the discharge sides of said gears to said chamber, means for conducting pressure fluid from said chamber to the intake sides of said gears, valve means within said chamber for controlling the flow of pressure fluid between the discharge sides of said gears and said chamber, said valve means comprising cooperating telescopically arranged relatively fixed and substantially axially movable members within said chamber, one of these members having one or more series of ports, the ports of each of said one or more series decreasing progressively in area substantially from fully open to closed position of said valve means so that said ports may be controlled in succession.

2. A fluid pressure transmission of the class described, comprising shaft sections, a sun gear of the impeller type fixed on one of said shaft sections, orbit gears of the impeller type in cooperative engagement with said sun gear to provide a pressure fluid impelling means, means connected with the other of said shaft sections for supporting said orbit gears substantially in static and dynamic balance about said sun gear, a pressure fluid circulatory system comprising a fluid cooling chamber having a capacity to contain the greater proportion of pressure fluid in said system and having a relatively large surface area exposed to cooling media, means for conducting pressure fluid from said chamber to the intake sides of said gears, means within said chamber providing a substantially axially extending passage for conducting pressure fluid substantially from the discharge sides of said gears to said chamber, valve means substantially within said chamber for controlling the flow of pressure fluid between the discharge sides of said gears and said chamber, said valve means comprising cooperating relatively fixed and substantially axially movable members, one of these members having one or more series of ports, the ports of each of said one or more series decreasing progressively in flow area from fully open to closed position of said valve means, so that said ports may be controlled in succession.

RALPH R. DE VORE.